US010769568B2

(12) United States Patent
Lim

(10) Patent No.: US 10,769,568 B2
(45) Date of Patent: *Sep. 8, 2020

(54) UAV ROUTING AND DATA EXTRACTION

(71) Applicant: HARTFORD FIRE INSURANCE COMPANY, Hartford, CT (US)

(72) Inventor: Ben J. Lim, South Windsor, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/984,585

(22) Filed: May 21, 2018

(65) Prior Publication Data

US 2018/0268331 A1   Sep. 20, 2018

Related U.S. Application Data

(63) Continuation of application No. 14/301,441, filed on Jun. 11, 2014, now Pat. No. 9,978,030.

(51) Int. Cl.
*G06Q 40/08* (2012.01)
*G06Q 10/06* (2012.01)
*G06Q 50/18* (2012.01)
*G06Q 10/10* (2012.01)
*G06Q 50/00* (2012.01)
*G06Q 10/08* (2012.01)

(52) U.S. Cl.
CPC ........ *G06Q 10/0633* (2013.01); *G06Q 10/10* (2013.01); *G06Q 40/08* (2013.01); *G06Q 50/18* (2013.01); *G06Q 10/0631* (2013.01); *G06Q 10/06312* (2013.01); *G06Q 10/087* (2013.01); *G06Q 10/0833* (2013.01); *G06Q 50/01* (2013.01)

(58) Field of Classification Search
CPC .... G06Q 40/08; G06Q 10/0633; G06Q 10/10; G06Q 50/18; G06Q 10/0631; G06Q 10/087; G06Q 50/01
USPC ........................................................... 705/4
See application file for complete search history.

(56) References Cited

U.S. PATENT DOCUMENTS

| | | | | |
|---|---|---|---|---|
| 5,575,438 A | * | 11/1996 | McGonigle | B64C 39/024 244/118.1 |
| 8,078,319 B2 | * | 12/2011 | Franke | G05D 1/0088 700/248 |
| 8,078,436 B2 | | 12/2011 | Pershing et al. | |
| 8,081,795 B2 | | 12/2011 | Brown | |

(Continued)

OTHER PUBLICATIONS

Patents; "unmanned vehicle civil communications systems and methods" in patent application approval process. (Dec. 20, 2012). Computer Weekly News Retrieved from https://dialog.proquest.com/professional/docview/1237151634?accountid=131444 on Apr. 29, 2020 (Year: 2012).*

(Continued)

*Primary Examiner* — Kito R Robinson
(74) *Attorney, Agent, or Firm* — Howard IP Law Group, PC

(57) ABSTRACT

This invention relates to a drone based predictive system for detecting and analyzing web and drone based data in order to mitigate potential losses and enhance risk mitigation activities in commercial insurance such as for business owners policies and workers compensation. The drone is able to capture from a plurality of angles and perspective to provide data to effect a variety of insurance based actions.

20 Claims, 9 Drawing Sheets

(56) References Cited

U.S. PATENT DOCUMENTS

| | | | |
|---|---|---|---|
| 8,229,768 | B1 | 7/2012 | Hopkins, III |
| 8,306,258 | B2 | 11/2012 | Brown |
| 8,346,578 | B1* | 1/2013 | Hopkins, III .......... G06Q 40/00 382/100 |
| 8,600,104 | B2 | 12/2013 | Brown |
| 8,650,106 | B1 | 2/2014 | Hopkins, III |
| 8,660,864 | B2* | 2/2014 | Krause ................. G06Q 40/08 705/4 |
| 8,768,667 | B2* | 7/2014 | Lindores ................ G06F 16/29 703/6 |
| 8,929,586 | B2* | 1/2015 | Brown ................. G06T 11/206 382/100 |
| 9,002,719 | B2* | 4/2015 | Tofte ................... G06K 9/6201 705/4 |
| 9,082,015 | B2* | 7/2015 | Christopulos ...... G06K 9/00637 |
| 9,085,363 | B2* | 7/2015 | Tofte ................... B64C 39/024 |
| 9,147,353 | B1* | 9/2015 | Slusar ................. G08G 1/0129 |
| 9,152,863 | B1* | 10/2015 | Grant ................... G06Q 40/08 |
| 9,201,422 | B2* | 12/2015 | Ohtomo ................ G05D 1/0094 |
| 9,262,789 | B1* | 2/2016 | Tofte ................... G06Q 10/10 |
| 9,262,929 | B1* | 2/2016 | Roy ..................... G08G 5/0034 |
| 9,412,280 | B1* | 8/2016 | Zwillinger .......... G08G 5/0069 |
| 9,464,902 | B2* | 10/2016 | Isler .................... G01C 21/005 |
| 9,489,852 | B1* | 11/2016 | Chambers ............. G05D 1/101 |
| 9,505,494 | B1* | 11/2016 | Marlow ............... B64C 39/024 |
| 9,563,201 | B1* | 2/2017 | Tofte ................... G05D 1/0038 |
| 9,613,539 | B1* | 4/2017 | Lindskog ............. B64D 17/80 |
| 9,665,094 | B1* | 5/2017 | Russell ................ B64C 39/024 |
| 9,817,396 | B1* | 11/2017 | Takayama ............. G05D 1/0038 |
| 10,031,518 | B1* | 7/2018 | Tofte ................... G06F 3/04847 |
| 10,134,092 | B1* | 11/2018 | Harvey ................ G06Q 40/08 |
| 10,380,694 | B1* | 8/2019 | Grant .................. G06Q 50/265 |
| 2008/0052621 | A1* | 2/2008 | Oliverio ............... G06Q 10/10 715/700 |
| 2009/0265193 | A1* | 10/2009 | Collins ............... G06Q 30/0185 705/4 |
| 2011/0130636 | A1* | 6/2011 | Daniel ................. B64C 39/024 600/301 |
| 2011/0161118 | A1* | 6/2011 | Borden ............... G06Q 10/067 705/4 |
| 2011/0184604 | A1* | 7/2011 | Franke ................ F41G 9/00 701/23 |
| 2012/0210853 | A1* | 8/2012 | Abershitz ............. F41H 11/00 89/1.11 |
| 2012/0275651 | A1* | 11/2012 | Brown ................ G06T 11/206 382/103 |
| 2013/0013345 | A1* | 1/2013 | Wallquist ............. G06Q 40/08 705/4 |
| 2013/0013346 | A1* | 1/2013 | O'Connor ............ G06Q 10/10 705/4 |
| 2013/0226624 | A1* | 8/2013 | Blessman ............. G06Q 40/08 705/4 |
| 2013/0262029 | A1 | 10/2013 | Pershing |
| 2013/0317861 | A1 | 11/2013 | Tofte et al. |
| 2013/0317863 | A1 | 11/2013 | Tofte et al. |
| 2013/0317864 | A1 | 11/2013 | Tofte et al. |
| 2013/0317865 | A1* | 11/2013 | Tofte ................... G06Q 10/06 705/4 |
| 2014/0081670 | A1* | 3/2014 | Lim ..................... G06Q 50/01 705/4 |
| 2014/0244317 | A1* | 8/2014 | Roberts ................ G06Q 40/08 705/4 |
| 2014/0316614 | A1* | 10/2014 | Newman .............. B64C 39/024 701/3 |
| 2015/0025914 | A1* | 1/2015 | Lekas ................. G06K 9/00637 705/4 |
| 2015/0170288 | A1* | 6/2015 | Harton ................. G06Q 40/08 705/4 |
| 2015/0220085 | A1* | 8/2015 | Ohtomo ............... G01C 15/002 701/2 |
| 2015/0228031 | A1* | 8/2015 | Emison ................ G06F 16/116 705/4 |
| 2015/0287142 | A1* | 10/2015 | Brown .................. G06Q 50/01 705/4 |
| 2015/0336667 | A1* | 11/2015 | Srivastava ............ G06Q 10/00 701/2 |
| 2015/0363717 | A1* | 12/2015 | Lim ..................... G06Q 40/08 705/4 |
| 2016/0097672 | A1* | 4/2016 | Claudel ................ G01S 5/0027 340/870.11 |
| 2016/0292872 | A1* | 10/2016 | Hammond ........... B64C 39/024 |
| 2016/0313736 | A1* | 10/2016 | Schultz ............... G06F 16/5838 |
| 2017/0103465 | A1* | 4/2017 | Zentler ................ G06Q 40/08 |

OTHER PUBLICATIONS

Tuna, G., Mumcu, T. V., Gulez, K., Gungor, V. C., & Erturk, H. (2012). Unmanned aerial vehicle-aided wireless sensor network deployment system for post-disaster monitoring Springer Verlag, Tiergartenstrasse 17, D-69121. doi:http://dx.doi.org/10.1007/978-3-642-31837-5_44 Retrieved . . . (Year: 2012).*

Winkvist, S., Rushforth, E,, & Young, K, (2013). Towards an autonomous indoor aerial inspection vehicle. The Industrial Robot, 40( 3), 196-207. doi:http://dx.doi.org/10.1108/01439911311309870 retrieved on Dec. 20, 2017 {Year; 2013), 13 Pages.

* cited by examiner

| Insurance Identifier | Deviation Source and Type | Location | UAV Identifier | Data Type |
|---|---|---|---|---|
| 12123_AXX1 | Web- SIC | Lat: 40° 45' 33.8394" Long: -72° 11' 90.5356" | UAV123_2 | Video |
| 22233_BRRX1 | SIU- WC | Lat: 32° 45' 55.8394" Long: -72° 24' 80.5863" | UAV123_565 | Image |
| 11678_CCFX2 | Web-WC | Lat: 71° 45' 66.8394" Long: -72° 44' 50.5345" | UAV123_3221 | Image |
| 34123_AXBB4 | Web-SIC | 523 Hartford Lane | UAV123_112 | Image, Video |

FIG. 6

UAV ROUTING AND DATA EXTRACTION

CROSS-REFERENCE TO RELATED APPLICATIONS

This application is a continuation application of co-pending U.S. patent application Ser. No. 14/301,441, entitled System And Method For Processing of UAV Based Data For Risk Mitigation And Loss Control, filed Jun. 11, 2014, the contents of which are hereby incorporated herein by reference in their entirety for all purposes.

BACKGROUND

Companies, business owners and employers purchase a variety of insurance products from insurance companies related to employees. Examples of these insurance products include business owners insurance (BOP), workers compensation insurance, short term disability insurance, long term disability insurance, property, auto and other insurance products. Premiums are calculated by the insurance company based on factors such as business type, business size, estimated numbers of employees, employee occupations, anticipated injuries, likelihood of fraud, salary ranges of employees, locations of employees, and other factors.

In assessing businesses, the industrial classification of an entity is an important factor in determining insurance risk. There are many standardized industrial classification systems, such as Standard Industrial Classification (SIC), North American Industrial Classification System (NAICS), Global Industry Classification System (GICS), Industrial Classification Benchmark (ICB), Thomson Reuters Business Classifications (TRBC), Statistical Classification of Economic Activities (NACE), Australian and New Zealand Standard Industrial Classifications (ANZSIC), and International Standard Industrial Classifications (ISIC). Many of these are multi-digit code systems, wherein each digit, reading from left to right, specifies an entity's sector more specifically. For example, in the four-digit ICB, the first digit indicates industry, the second digit plus the first digit specify a supersector, the first three digits indicates sector, and the full four digits specify a subsector.

Current methods for aligning entities with appropriate industries are error prone. In some cases, the operations of an entity are too varied to neatly fit into one or two industrial classifications, causing activities of the entity to be ignored when an insurance quote is being determined. In other cases, the industrial code assigned to an entity is too general for assigning an accurate risk factor. For large and established companies, a third party data vendor may supply an industrial classification, but for new or small companies, third party vendors may not have an industrial classification available. In these cases, the burden of classifying the industry falls onto the entity itself or the agent. Whether with deceptive or honest intentions, the assigned industrial classification the agent or entity assigns is often incorrect or inadequate. Insurance companies produce hundreds of thousands of insurance quotes per year, so it is impossible for insurance companies to closely examine the industrial classification of each entity they develop a quote for. Additionally, businesses and evolve and change so that the initial classification may not be accurate at some point in the future as business expand, contract or modify the products or services they provide.

For these reasons, an industrial classification assigned to an entity may not accurately represent the entity's operation, leading to economic consequences for the insurance company. For example, if a business initially started as a coffee shop then begins to serve food as a restaurant there will be additional risks and liabilities associated with the new business or change in business and therefore re-classification and re-rating of the business is needed.

Companies also purchase workers compensation insurance to help injured workers. Workers compensation insurance covers medical expenses injured employees as well as wages lost due to not being able to work. Workers' compensation insurance also provides benefits such as rehabilitation services and medical care to workers that are injured in the course of their employment. Short term and long term disability insurance provides similar benefits for workers in situations where workers compensation insurance is not applicable. When a worker is injured or otherwise disabled, the worker may receive care from a number of different service providers, such as doctors, hospitals, and providers of rehabilitative services. These benefits make fraudulent workers' compensation and disability claims an enticing target for fraud. Workers' compensation and disability insurance fraud may occur in simple to complex schemes that often require difficult and lengthy investigations. For example, an employee either inflates the extent of his/her injuries, or simply fabricates injuries that never existed altogether. Fraud costs insurance companies billions of dollars a year and is a very serious industry issue.

As with re-classification of businesses, it would be desirable to have a system for re-verifying and validating businesses and individuals in the area of commercial related insurance such as business owner insurance and workers compensation and disability.

SUMMARY

The present invention in some embodiments relates an insurance system for managing commercial insurance based policy data, the insurance system comprising one or more data storage devices storing data relating to a plurality of commercial insurance policies; one or more computer processors in communication with the one or more data storage devices; a communications interface in communication with the one or more computer processors and the one or more data storage device; and a memory, coupled to the one or more computer processors, storing program instructions which, when executed by the one or more computer processors, cause the one or more computer processors to: receive data via the communications interface indicative of a potential exception condition related to a commercial insurance policy; determine instructions related to the potential exception condition to communicate to at least one unmanned aerial vehicle (UAV) device; receive data via the communications interface from at least one UAV related to the exception condition; access the commercial insurance policy on one of the storage devices; process the data indicative of the potential exception condition and the received data from the UAV to determine a policy action for the commercial insurance policy; and communicating via the communications interface with an insurance subsystem to initiate an insurance workflow process related to the policy action.

In some embodiments, the present invention relates to an insurance system for workers compensation insurance claim management, the insurance system comprising one or more data storage devices storing data relating to a commercial insurance policy; one or more computer processors in communication with the one or more data storage devices; a communications device in communication with the one or more computer processors and the one or more data storage device; and a memory, coupled to the one or more computer processors, storing program instructions which, when executed by the one or more computer processors, cause the one or more computer processors to: receive social media data indicative of at least one potential deviation from a baseline parameter of a commercial insurance policy; receive data from at least one drone device related to the deviation; analyze the received data relative to the baseline reference data to determine if a deviation exists with respect to the baseline reference data; and initiate an insurance workflow process to modify underlying commercial policy parameters if a deviation exists.

In some embodiments, the present invention relates to a computer-implemented insurance processing method for management of commercial insurance policy deviations, the method comprising receiving social media based data indicative of at least one potential deviation from a baseline parameter of a commercial insurance policy; issuing instructions to at least one drone device to collect information about the potential deviation; receiving data from the at least one drone device related to the deviation; analyzing the received data relative to the baseline reference data to determine if a deviation exists with respect to the baseline reference data; and initiating an insurance workflow process to adjust an action related to the commercial insurance policy if a deviation is determined to exist.

BRIEF DESCRIPTION OF THE DRAWINGS

A more detailed understanding may be had from the following description, given by way of example in conjunction with the accompanying drawings wherein:

FIG. 6 shows an exemplary database structure of an embodiment of the present invention.

DETAILED DESCRIPTION

Figure 1:
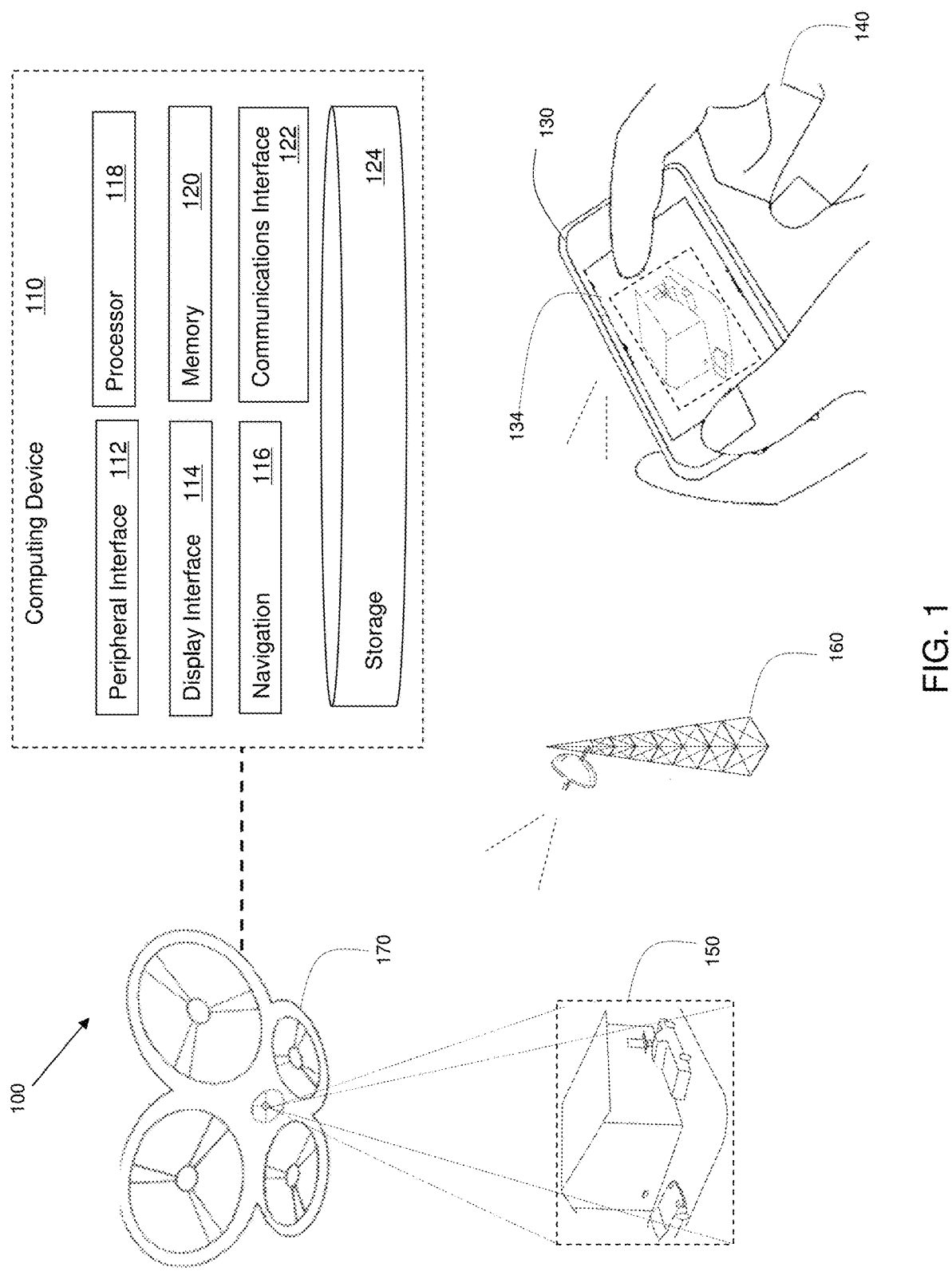
FIG. 1 shows an exemplary computer architecture that may be used for compiling and assessing Unmanned Aerial Vehicle ("UAV:") data administration and management.

Disclosed herein are processor-executable methods, computing systems, and related technologies for the accessing, processing and analyzing of Unmanned Aerial Vehicle (UAV) or drone based data for insurance-related data processing, including risk assessment, fraud prevention, loss control and management of insurance claims particularly in the field of commercial business insurance and workers compensation insurance. In embodiments of the present invention, unmanned aerial vehicles or drones are used to supplement insurance claims information such as in the investigation of fraud in a workers compensation context or to help verify business use and classifications such as for a business owner's policy offering. Generally, embodiments of the present invention operate by processing data from one or more sources, such as social media, to determine if a potential violation or exception condition has occurred with respect to a commercial insurance policy. The violation or exception condition may be related to a mis-classification of a business, a need for a re-classification or underwriting of a business, or a workers compensation claim issue such as fraudulent activity related to an alleged injury by an employee of a commercial enterprise. The received data is then supplemented with information from a UAV, such as pictures, video, sound or other pictorial based data that may support the determination that an exception condition has occurred. The UAV is able to capture the data from a plurality of angles, perspectives and vantage points based on the highly maneuverable capabilities of the UAV. For example, the UAV may be able to obtain images from a plurality of vantage points to provide images of the roof and all outer walls of a building, thereby providing more data than either satellite imagery or images from vehicles or pedestrians on public rights of way. The UAV may be able to remain in a single position, or within view of a given building or side of a building, for periods of consecutive hours, or in different flights, thereby permitting comparison of time stamped images from different times, and facilitating real time comparison of images to show activity at different times of day, and changes in activity or in buildings themselves. The UAV's location may not be limited by location, as permitted by law. In embodiments, a UAV of size to enter through a doorway or other entrance may be operated so as to enter a building to collect images, subject in appropriate cases to prior authorization, such as authorization by law, in insurance application documents and/or policy documents. In response, an insurance entity may conduct further investigation of the exception condition or institute other actions or procedures such as offering a policyholder additional coverage, cancelling a policy, re-pricing a policy, initiating a claims process, etc.

In embodiments of the present invention, the UAV, commonly known as a drone, is an aircraft or airborne vehicle that is piloted remotely under the control or direction of the insurance entity or a third party providing UAV services directly or indirectly to the insurance entity, and/or partners and affiliates of the insurance entity. The UAV or drone is controlled either autonomously by onboard computers or by the remote control of an entity on the ground or in another vehicle, or by a combination of those. Drones are well suited for covering wide areas of geographic locations quickly and economically as well as areas that may pose physical and environmental hazards to humans, whether on foot or in a ground vehicle, such as catastrophe ridden areas or locations that are not easily accessed by humans, or where discretion and privacy are valuable, such as in the detection of fraud by certain entities as may be common in a workers compensation context. Drones or UAVs would be helpful in assessing and detecting certain situations involving such additional or new uses for commercial enterprises such as a change in business classification as well as fraud in workers compensation such as if an allegedly injured person is engaging in activities that the injury would normally prevent. For example, if a person with an alleged serious back injury is engaging in vigorous exercise, as confirmed by video data obtained via cameras on an UAV monitoring the individual's property, then this may be an indicator of fraud, or a confirmation of fraud suspected based on other data associated with the individual. Similarly, if cameras on a UAV obtain video images of an individual walking slowly and with a limp, this may be an indication that suspicions of fraud in connection with severity of a leg injury are not correct. The UAV may be able to collect certain information such as documented images that help make the fraud determination and thus will help the insurance company manage the claim to the benefit of the public and other insureds.

Embodiments of the invention may be applicable to obtaining UAV data associated with potential exceptions and deviations for a wide variety of insurance policies, including commercial insurance policies such as business owners policies. Business owners policies include coverages for multiple risks applicable to a business, such as both property insurance and liability insurance, and may include one or more of vehicle insurance coverage, loss of business income or business interruption insurance and employment practices liability insurance.

FIG. 1 shows an example system architecture 100 that may be used for fraud detection and prevention, risk management, loss control and the predictive administration and management of insurance claims using UAV based data. FIG. 1 shows an example computing device 110 that may be used to implement features describe above for managing insurance related data in accordance with embodiments of the present invention. Computing device may be integrated as part of a UAV device 170 that is communication with a remote computing device 130 that is being operating by an insurance company entity 140. UAV device 170 is configured to capture image, sound and/or video data 150 that may be transmitted and displayed on display 134 associated with remote device 130.

It is contemplated that the UAV data such as images, videos or text 150 utilized in embodiments of the present invention generally may be geocoded or geotagged. Geotagging results in the photo having accessible geographical identification metadata that usually consists of latitude and longitude coordinates, as well as altitude, bearing, distance, accuracy data, and place names. Geotagging can assist in embodiments of the present invention by having the insurance subsystem search for images taken at a selected location, such as an insured property location or a home of an individual who is seeking or has obtained workers compensation benefits, by providing latitude and longitude coordinates or other location identifier. Location identification may also include geocoding or using non-coordinate based geographical identifiers, such as a street address, name of a business, non-profit, facility, individual or landmark associated with the location and finding associated geographic coordinates for the photos or data in embodiments of the present invention.

Generally, data or photos may be accessed and stored in a variety of formats including the JPEG file format where the geotag information will be typically embedded in the metadata stored in Exchangeable image file format (EXIF) or Extensible Metadata Platform (XMP) format. Location information such as latitude and longitude may be stored in units of degrees with decimals, such as in the form of global positioning coordinates, such as Global Positioning System (GPS) Latitude: 81 deg 48' 15.73" S; GPS Longitude: 19 deg 15' 27.74" W; GPS Position: 47 deg 28' 62.31" S, 11 deg 14' 36.78" E or alternatively location information could also be presented in formats such as: GPS Latitude 92.32212; GPS Longitude: 20.14436 and GPS Position: 47.65611 11.21113. This location or geo data is then matched or linked with geographic data associated with a commercial insurance policy, such as an address of an insured commercial enterprise or a home address of an individual claimant for workers compensation benefits. For example, a photograph that has coordinates or location data that matches with a physical address of an insured property will be deemed to be indicative of conditions or activity at that property such as certain business activities that may be deemed to be beyond the scope of coverage that the business initially was rated for.

Referring still to FIG. 1, the computing device 110 may include a peripheral device interface 112, display device interface 114, a navigation component 116, a processor 118, a memory device 120, a communication interface 122 and data storage 124. In operation, computing device 110 is configured to receive and transmit a number of data flows via communications interface 122 including, for example, image, sound and/or video data such as from devices 170 and 130.

The peripheral device interface 112 may be an interface configured to communicate with one or more peripheral devices such as a digital camera. The digital camera may be configured to capture both motion video images and still images. The peripheral device interface 112 may operate using a technology such as Universal Serial Bus (USB), PS/2, Bluetooth, infrared, serial port, parallel port, and/or other appropriate technology. Additionally, the peripheral device interface 112 may, for example, receive input data from an input device such as a keyboard, a mouse, a trackball, a touch screen, a touch pad, a stylus pad, and/or other device. Alternatively or additionally, the peripheral device interface 112 may communicate output data to a printer that is attached to the computing device 110 via the peripheral device interface 112.

The display device interface 114 may be an interface configured to communicate data to display device 134. The display device 134 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 114 may operate using technology such as Video Graphics Array (VGA), Super VGA (S-VGA), Digital Visual Interface (DVI), High-Definition Multimedia Interface (HDMI), or other appropriate technology. The display device interface 114 may communicate display data from the processor 118 to the display device 134 for display by the display device 134. As shown in FIG. 1, the display device 134 may be external to the computing device 110, and coupled to the computing device 110 via the display device interface 114.

Navigation component 116 provides navigation capabilities for UAV 170 such as an on-board navigational radio transceiver and a flight program unit. Navigation component 116 may be responsive to signals from device 130 or may be preprogrammed for flight to a certain policyholder location or other location associated with a commercial insurance policy. Navigation component 116 may include Global Positioning System (GPS), Global Navigation Satellite System (GNSS), inertial navigation system (INS) and/or other similar navigation capabilities for assisting in navigating UAV 170.

The memory device 120 of FIG. 1 may be or include a device such as a Dynamic Random Access Memory (D-RAM), Static RAM (S-RAM), or other RAM or a flash memory. The storage device 124 may be or include a hard disk, a magneto-optical medium, an optical medium such as a CD-ROM, a digital versatile disk (DVDs), or Blu-Ray disc (BD), or other type of device for electronic data storage.

The communication interface 122 may be, for example, a communications port, a wired transceiver, a wireless transceiver, and/or a network card. The communication interface 122 may be capable of communicating using technologies such as Ethernet, fiber optics, microwave, xDSL (Digital Subscriber Line), Wireless Local Area Network (WLAN) technology, wireless cellular technology, and/or any other appropriate technology.

Remote device 130 may be configured to control the operation of UAV device 170. Control instructions such as location coordinates are generally transmitted from remote control device 130 to the UAV 170 through a wireless network 160. Wireless network 160 may be implemented using any wireless data transmission including but not limited to TDMA, GSM, CDPD, GPRS, EDGE, and UMTS. In a preferred embodiment, a data communications link layer is implemented using one of these technologies, a data communications network layer is implemented with the Internet Protocol ("IP"), and a data communications transmission layer is implemented using the Transmission Control Protocol ("TCP"). In such systems, location type information between the UAV 170 and remote control device 130 are transmitted using an application-level protocol such as, for example, the HyperText Transmission Protocol ("HTTP"), the Wireless Application Protocol ("WAP"), the Handheld Device Transmission Protocol ("HDTP"), or any other data communications protocol as will occur to those of skill in the art.

As used herein, "TDMA" stands for Time Division Multiple Access, a technology for delivering digital wireless service using time-division multiplexing. "GSM" stands for Global System for Mobile Communications, a digital cellular standard in Europe and Asia. "CDPD" stands for Cellular Digital Packet Data, a data transmission technology developed for use on cellular phone frequencies. "GPRS" stands for General Packet Radio Service, a standard for wireless data communications that supports a wide range of speeds, is an efficient use of limited bandwidth and is particularly suited for sending and receiving small bursts of data, such as e-mail and Web browsing, as well as large volumes of data. "EDGE" stands for Enhanced Data Rates for GSM Evolution, a standard for wireless data communications supporting high data transfer rates. "UMTS" stands for Universal Mobile Telecommunication System, a standard for wireless data communications supporting high data transfer rates and also referred to as W-CDMA for Wideband Code Division Multiple Access.

Alternatively or additionally, an instance of the computing device 110 may be configured to perform any feature or any combination of features described herein. In such an instance, the memory device 120 and/or the storage device 124 may store instructions which, when executed by the processor 118, cause the processor 118 to perform any feature or any combination of features described herein. In such an instance, the processor 118 may perform the feature or combination of features in conjunction with peripheral device interface 112, display interface 114, memory 120, communication interface 122, and/or data storage device 124.

Although FIG. 1 shows that the computing device 110 includes a single processor 118, single memory device 120, single communication interface 122, single peripheral device interface 112, single display device interface 114, and single storage device 124, the computing device may include multiples of each or any combination of these components and may be configured to perform analogous functionality to that described above.

Figure 2:
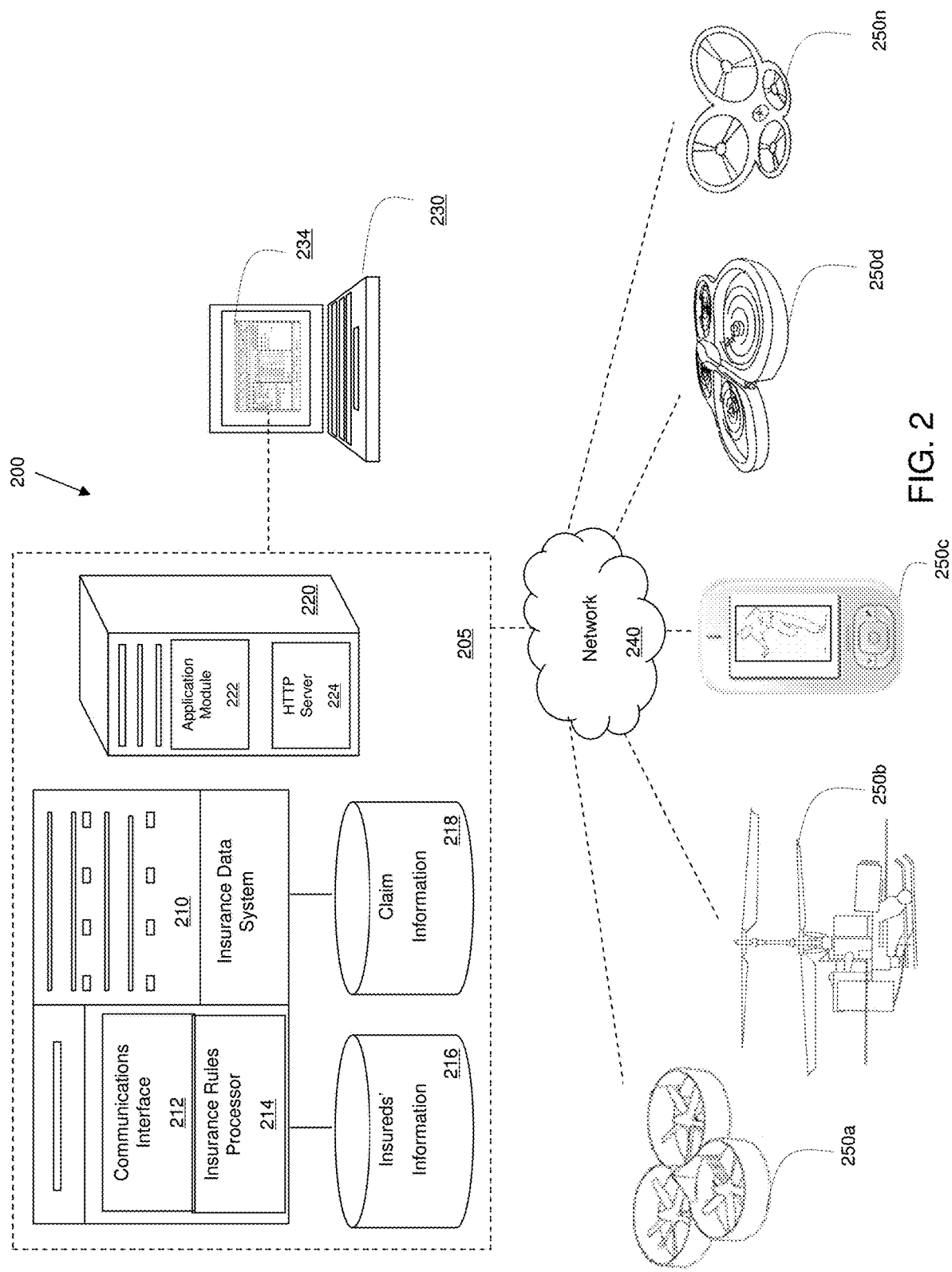
FIG. 2 shows an exemplary system that may be used for the management and analysis of UAV data for insurance purposes.

FIG. 2 shows an example system architecture 200 that may be used for fraud detection and prevention, loss control and administration and management of insurance claims using UAV based data. The example architecture 200 includes an insurance entity computer system 205 including an insurance data system 210, a web system 220 and an insurance terminal 230, a network 240, and a plurality of remote devices 250*a-n* such as drone type devices and handheld computing devices. Insurance data system 210 may include a communications interface 212, an insurance rules processor 214, an insureds' information database 216 and claim information database 218.

In one embodiment, insurance rules processor 214 may include one or more rules and/or predictive models. The insurance rules processor 214 may use the one or more rules and/or predictive models to evaluate certain internet or web data as well as claims data to determine, for example, if an exception condition, or a potential exception condition, has occurred such as if a likelihood of fraud or a change in use exists in an insurance claim. Generally, a predictive model takes into account a plurality of parameters, and in embodiments may take into account any number of parameters, such as up to 10 parameters, up to 100 parameters or more parameters. The predictive model may include one or more of neural networks, Bayesian networks (such as Hidden Markov models), expert systems, decision trees, collections of decision trees, support vector machines, or other systems known in the art for addressing problems with large numbers of variables. Preferably, the predictive model is trained on prior data and outcomes known to the insurance company. The specific data and outcomes analyzed vary depending on the desired functionality of the particular predictive model. The particular data parameters selected for analysis in the training process are determined by using regression analysis and/or other statistical techniques known in the art for identifying relevant variables in multivariable systems.

In other embodiments, one or more decision trees, equations or tables may be included with and executed by insurance rules processor 214. Decision trees may include decisions relating to identified terms and phrases and equivalent terms and phrases, in accordance with text based analysis principles.

In one embodiment, insurance data system 210, insurance terminal 230, and remote device 250*a-n* are in communication via a network 240. Insurance data system 210 shown in FIG. 2 is an embodiment of a system that might be implemented solely within the corporate office headquarters of a financial services/insurance company or be an aggregation of one or more other subsystems including one or more partner, third party administrator and/or vendor subsystems to allow communications and data transfer between the insurance company and claims representatives, investigators, adjusters, insurance customers, and insurance agents. Data transferred through network 240 to insurance system 210 may pass through one or more firewalls or other security type controls implemented within web system 220 and/or in standalone devices. The firewall allows access to network 240 only through predetermined conditions/ports. In another embodiment, the firewall restricts the Internet IP addresses that may access web system 220.

In operation, insurance system 210 may implement spider/webcrawler technology to search via network 240 for data from third party information sources, such as social media information or website data in the form of digital photographs, text, videos, sound and other data that may indicate a potential likelihood of fraud. For example, certain insureds posting information about their activities that may indicate that a certain alleged injury may be fabricated such as on a social media website may be accessed thereby necessitating an investigation or a claims related inquiry. In another example, a business may be posting up information or may have information posted up about the business by other entities that may indicate the business may have changed or altered thereby necessitating a re-rating or re-evaluation.

In embodiments, information from third party information sources, such as social media sites and websites, may be accessed and processed to identify changes in one or more businesses other than an insured business. Such businesses other than the insured may include lessees of property owned by the insured and covered under a policy, nearby businesses, such as other businesses located in a strip mall or other building in which a facility of the insured is located, and other businesses, changes in which may represent a change in the risk profile of the insured, thereby necessitating or rendering advisable a policy action, such as a re-underwriting or re-rating of the insured. For example, a change from a retailer such as a florist to a check cashing business or a pawn shop may require policy action for an insured landlord or a neighboring business. Similarly, a change from a retail establishment to a restaurant, caterer or commercial kitchen may represent a greater risk of fire, rendering policy actions, such as re-rating or re-underwriting, necessary or advisable for an insured landlord or an insured business in a same or neighboring building. In some embodiments, a grouping of businesses may be insured and rated together. Generally, where one or more establishments in such a grouping of business has changed, the entire risk profile may change, rendering necessary or advisable a policy action such as the re-rating or re-underwriting of the insured.

Referring to FIG. 2 still, insurance rules processor 214 may include one or more business rules and one or more predictive models, decision trees, equations and/or tables, in conjunction with one or more software modules or objects and one or more specific-purpose processor elements, to perform the processing required by embodiments of the present invention such as for evaluating data to detect one or more instances of activity or indications of a potential fraudulent insurance claim or an exception, correlate the one or more instances of activity with an in force insurance policy, and issuing an electronic instruction to the remote devices 250a-n to capture additional information about the instance of activity. For example, if certain internet based activity is detected then an instruction to the remote device, such as the drone may be provided to send the drone to a certain location to capture additional information.

The insureds' information database 216 may store information, data and documents that relate to insureds' policies such as workers compensation, home, business and/or automobile related policy information as well as location information. Claim information database 218 may store information, data and documents from user devices 232a-n and remote devices 250a-n. Insureds' information database 216 and claim information database 218 may be spread across one or more computer-readable storage media, and may be or include one or more relational databases, hierarchical databases, object-oriented databases, one or more flat files, one or more spreadsheets, and/or one or more structured files. Insureds' information database 216 and claim information database 218 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology. Communication between the insurance data system 210 and the other elements in the example architecture 200 of FIG. 2 may be performed via the communications interface module 212.

Referring still to FIG. 2, web system 220 may provide a web interface that may be accessed directly by a user such as an insured, a claims representative, a fraud investigator, an insurance adjuster and other third party entity employing user devices 232a-n to communicate and interact with an insurance company representative employing terminal 230. In certain embodiments, terminal 230 can include, but are not limited to cellular telephones, other wireless communication devices, personal digital assistants, pagers, laptop computers, tablet computers, smartphones, other mobile display devices, or combinations thereof. In embodiments of the present invention, terminal 230 may communicate with the web site system 220 that may be operated by or under the control of an insurance entity or other third party entity such as an outsourced type entity or third party administrator type entity.

The web site system 220 may include a web application module 222 and a HyperText Transfer Protocol (HTTP) server module 224. The web application module 222 may generate the web pages that make up the web site and that are communicated by the HTTP server module 224. Web application module 222 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 224 may implement the HTTP protocol, and may communicate HyperText Markup Language (HTML) pages and related data from the web site to/from client devices insurance terminal 234, user device 250c, using HTTP. The HTTP server module 224 may be, for example, a Sun-ONE Web Server, an Apache HTTP server, a Microsoft Internet Information Services (IIS) server, and/or may be based on any other appropriate HTTP server technology. The web site system 220 may also include one or more additional components or modules (not depicted), such as one or more switches, load balancers, firewall devices, routers, and devices that handle power backup and data redundancy.

Referring still to FIG. 2, terminal 230 may include a web browser module 234, which may communicate data related to the web site to/from the HTTP server module 224 and the web application module 222 in the web site system 220. The web browser module 234 may include and/or communicate with one or more sub-modules that perform functionality such as rendering HTML (including but not limited to HTML5), rendering raster and/or vector graphics, executing JavaScript, and/or rendering multimedia content. Web browser 234 may be used to access websites and social media that may contain information that relate to a potential exception condition or deviation related to an insured entity's policy. For example, an investigator related to an insurance entity may operate web browser module 234 to access social media based information, pictures, video, sound or other data that indicate that such an exception condition or deviation may have occurred or may be occurring.

Alternatively or additionally, the web browser module 234 may implement Rich Internet Application (RIA) and/or multimedia technologies such as Adobe Flash, Microsoft Silverlight, and/or other technologies. The web browser module 234 may implement RIA and/or multimedia technologies using one or web browser plug-in modules (such as, for example, an Adobe Flash or Microsoft Silverlight plugin), and/or using one or more sub-modules within the web browser module 234 itself.

The example architecture 200 of FIG. 2 may also include one or more wired and/or wireless networks via which communications between the elements and components shown in the example architecture 200 may take place. The networks may be private or public networks, cloud or shared networks and/or may include the Internet.

Each or any combination of the components/modules 212, 214, 222, and 224 shown in FIG. 2 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 2, these modules 212, 214, 222, and 224 may perform functionality described later herein.

Figure 3:
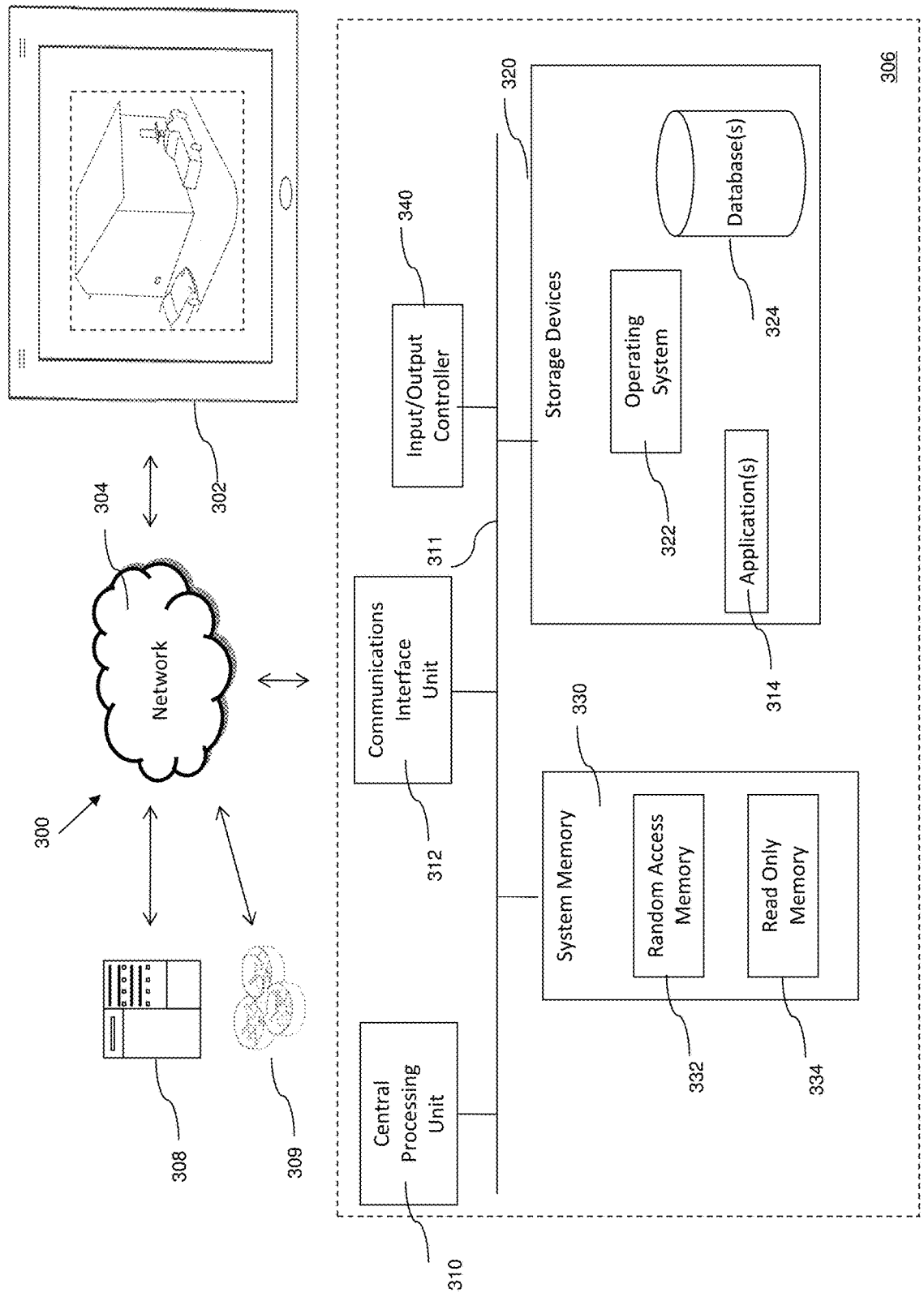
FIG. 3 shows another exemplary system of the present invention.

Referring to FIG. 3, an exemplary computer system 300 for use in an implementation of the invention will now be described. Computer system 300 may be configured to perform loss control services and claims evaluation and management for one or more insurance companies and their associated agents, personnel, customers and staff using devices 302. System 300 may include device 302, which may be an insurance company agent or vendor terminal or device, a network 304, an insurance processing and data system 306 and one or more third party servers 308 and a UAV or drone type device 309. In embodiments of the present invention, insurance processing and data system 306 is responsible for the processing of potential claims related data such as image, video and text data, from third party server 308 and UAV device 309. Third party servers may be administered by third party web operators or social media server operators. In insurance processing and data system 306, a central processing unit or processor 310 executes instructions contained in programs such as policy management application program 314, stored in storage devices 320. Processor 310 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 320 may include suitable media, such as optical or magnetic disks, fixed disks with magnetic storage (hard drives), tapes accessed by tape drives, and other storage media. Processor 310 communicates, such as through bus 311 and/or other data channels, with communications interface unit 312, storage devices 320, system memory 330, and input/output controller 340. System memory 330 may further include non-transitory computer-readable media such as a random access memory 332 and a read only memory 334. Random access memory 332 may store instructions in the form of computer code provided by application 314 to implement embodiments of the present invention. One or more computer programs may be stored in memory, or computer usable media, such as storage devices 320 and random access memory 332, in the form of computer readable program code adapted to be executed by at least one processor, such as a central processing unit 310. The one or more computer programs may include instructions for performing steps of methods of embodiments of the invention described herein. System 300 further includes an input/output controller 340 that may communicate with processor 310 to receive data from user inputs such as pointing devices, touch screens, and audio inputs, and may provide data to outputs, such as data to video drivers for formatting on displays, and data to audio devices.

Storage devices 320 are configured to exchange data with processor 310, and may store programs containing processor-executable instructions, and values of variables for use by such programs. Processor 310 is configured to access data from storage devices 320, which may include connecting to storage devices 320 and obtaining data or reading data from the storage devices, or placing data into the storage devices. Storage devices 320 may include local and network accessible mass storage devices. Storage devices 320 may include media for storing operating system 322 and mass storage devices such as storage 324 for storing data related to drone or UAV data, including GIS data and other located based data, in force insurance policy data including location data, such as physical address data, and address data such as telephone number data and e-mail address data, predictive model data, and claims related data.

Communications interface unit 312 may communicate via network 304 with other computer systems such as third party servers 308 as well as other internal and external servers, computer systems of remote sources of data, and with systems for implementing instructions output by processor 310. Insurance processing and data system 306 may also be configured in a distributed architecture, wherein databases, data storage devices and processors are housed in separate units or locations. The servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 304 may be or include wired or wireless local area networks and wide area networks, and over communications between networks, including over the Internet.

One or more public cloud, private cloud, hybrid cloud and cloud-like networks may also be implemented, for example, to handle and conduct processing of one or more transactions or processing of embodiments of the present invention. Cloud based computing may be used herein to handle any one or more of the application, storage and connectivity requirements of embodiments of the present invention. For example one or more private clouds may be implemented to store, process and otherwise handle UAV data and in force policy data of embodiments of the present invention. Furthermore, any suitable data and communication protocols may be employed to accomplish the teachings of embodiments of the present invention.

Figure 4:
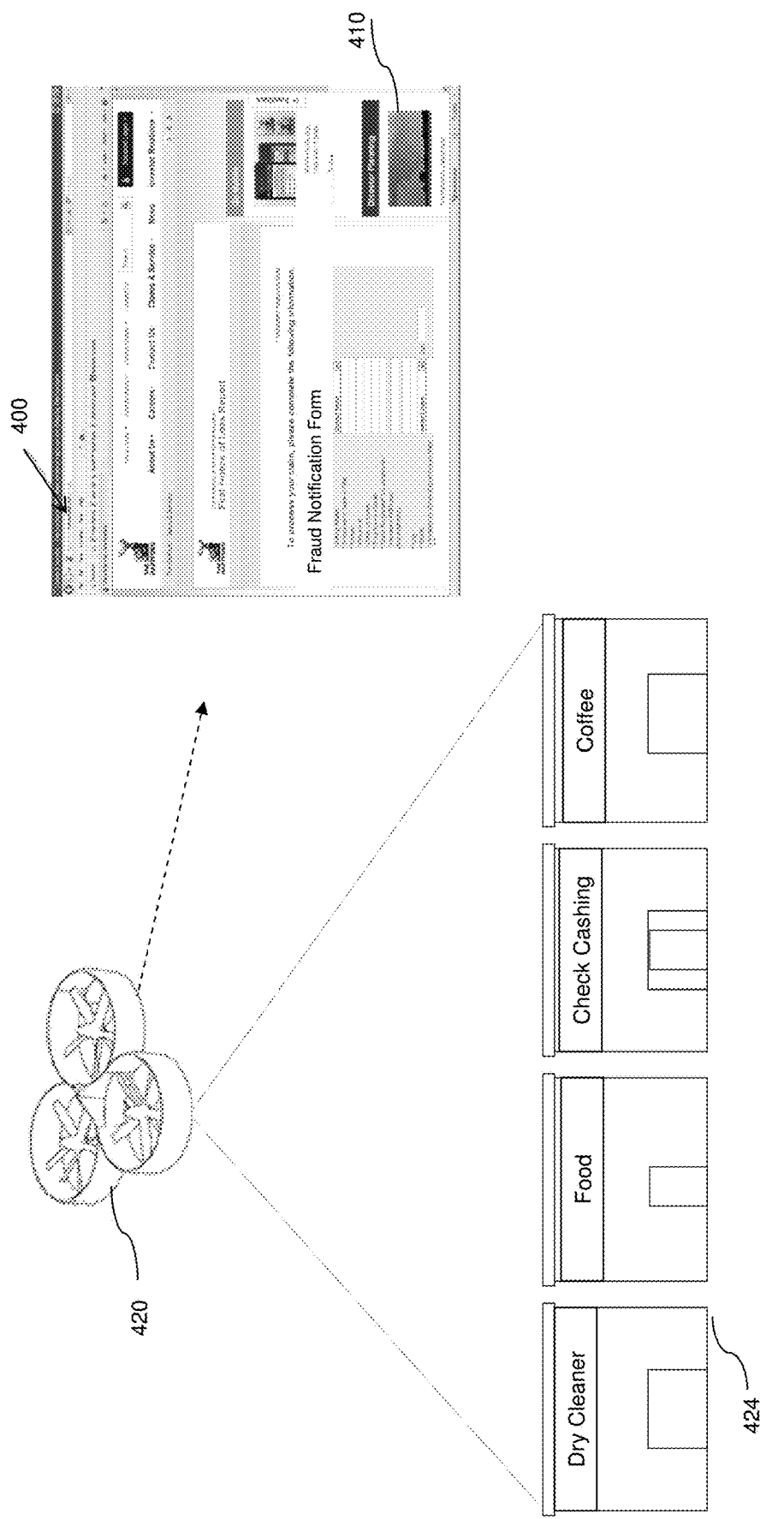
FIG. 4 shows an exemplary screen providing a communication to a user in an embodiment of the present invention.

FIG. 4 illustrates an exemplary insurance data management system 400 as discussed with respect to FIGS. 1-3. System 400 is configured to interface with a user such as an insurance company investigator or claims representative for fraud detection, loss control classification verification and/or claims management such as in a commercial insurance context. System 400 includes a website 410 that may include information that relates to a particular commercial insurance policy. For example, website 410 may display information related to a particular or policy such as claim related information that has been received from a UAV device 420 such as certain pictorial, video or other information 424. Processing units on UAV device 420, or other processing devices, may be configured to perform processing of image data, such as optical character recognition of store signage of business shown at 424. In embodiments, instructions provided for UAV devices may include instructions for operators to obtain clear images of store signage, which may involve operating UAV device 420 to fly at a certain orientation to a building housing a business so as to provide legible images of store signage. UAV device 420 is configured to communicate with an insurance entity that operates or controls website 410. UAV device 420 may be used in a commercial context, for verification or detection of an exception condition such as potential fraud or policy violations. For example, UAV 420 may capture information that may provide a business with pre-emptive notice to help mitigate a loss condition. UAV 420 may also capture information that demonstrates that a business has changed its primary mode of commerce, such as a change in signage to "Check Cashing" for a business identified in policy documents as a general or specific retailer, or by way of further example, an allegedly injured individual collecting workers compensation payments is not actually injured. UAV 420 may also be used to help verify or validate policies such as Business Owners Policies to determine if a business is properly engaging in activities for which they are insured. Generally, a business will be classified under a schema such the Standard Industrial Classification (SIC) schema which is system for classifying industries by a four-digit code and/or the North American Industry Classification System (NAICS) which is a schema used by business and government to classify business establishments according to type of economic activity. Other classification schema may be used and the present invention may be used to verify an initial classification or validate an ongoing classification such as at renewal or when triggered by certain information such as social media information that may indicate there is a potential deviation from the classification. For example, a business may post information about itself or customers may post information about the business on a website that may provide information that there is a deviation from the classification and the UAV may be dispatched, such as to an address associated with the business in an insureds' information database, to collect information regarding the potential deviation such as picture or video or other data either confirming or rebutting the deviation.

Figure 5:
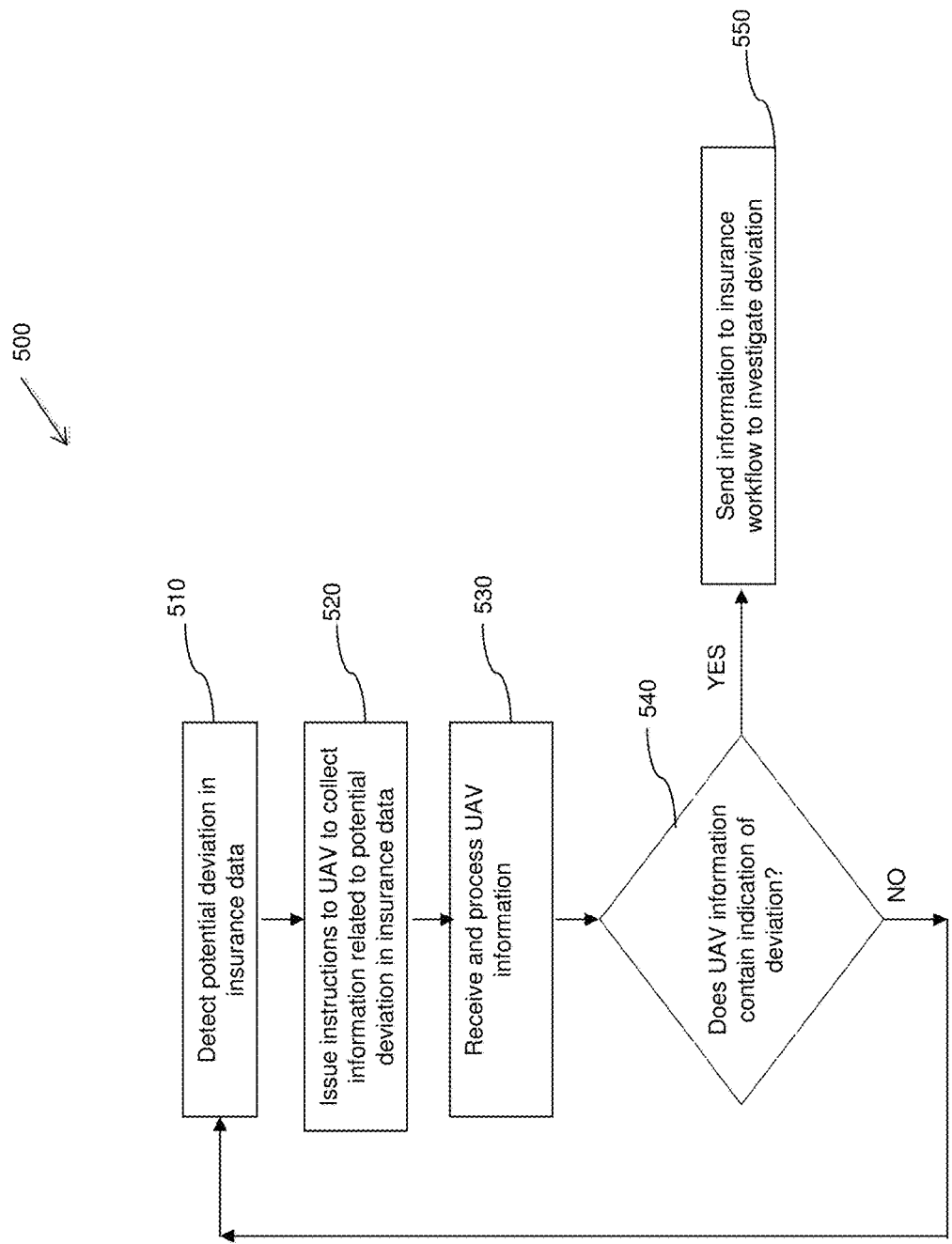
FIG. 5 shows a process flow diagram of an exemplary computer implemented method in accordance with the present invention.

FIG. 5 illustrates an exemplary computerized method 500 of the present invention. In one embodiment, the method 500 includes detecting a potential exception condition or deviation in the insurance data, step 510. Such a potential deviation may be detected by accessing and receiving social media based information, such as a website post, about a deviation such as a potential use that may not be covered in a commercial context or an injury that may not be valid in a workers compensation context. The method further continues with issuing instructions to a UAV device to collection information related to the potential deviation or exception condition in the insurance data, step 520. Such instruction may include policyholder related information such as a location or destination for the UAV to collect information. The location may be a business or a personal related location such as a place of work or home, obtained from one or more insurance databases or other databases.

The method continues with receiving and processing the UAV information, step 530. The information may be received directly from the UAV or other repository for the information. For example, the UAV may be operated by a third party service that receives still image, video and other data from the UAV, stores the received UAV data in a data storage location, and notifies an insurance data system that the received UAV data is available for access or transfer using suitable credentials. In embodiments, data collected by a UAV during only a portion of a flight by the UAV, such as only while the UAV, according to its onboard GPS data, was within a determined radius of a selected location (such as an insured business location or workers compensation claimant home address), may be available to the insurance data system. Processing the UAV information may include reviewing a baseline parameter of a commercial insurance policy to determine if a deviation exists with respect to the baseline reference data where the baseline reference data may be insurance policy contractual data. Processing the information may include image analysis or text or sound analysis to determine the content of the picture, video, sound or other information to determine if the UAV information contains an indication of a deviation, step 540. Additional processing of the UAV information such as optical character recognition of certain text, such as business signs or other text based information contained in the UAV information may be performed. For example, store signage may be processed to determine characteristics associated with a business. Text data from store signage may be compared to a business type or classification associated with a policy, or may be processed, such as using a predictive model, to determine a risk or likelihood that the classification of the business is different from the business classification on which underwriting and pricing of the policy was based. If the information includes an indication of a deviation or violation of one or more terms of a commercial insurance policy, the information is sent to an insurance subsystem to initiate an insurance workflow to investigate the deviation, exception condition or violation. The insurance workflow may involve a claims or Special Investigations Unit (SIU) to review the potential insurance fraud. The SIU may be comprised of Investigative Analysts, Intelligence Specialists and Field Investigators which combine to provide a strong comprehensive approach for initial examination, research and triage of all claims referred to the Special Investigations Unit to help detect, assess and handle the potential deviation or fraud. An exemplary workflow process may include modifying a policyholder contract, cancelling a policyholder contract, denying a claim, requesting additional information from a claimant, etc. The workflow process may also involve an insurance agent terminal who may be provided data indicative of the exception condition or deviation in order to try to investigate and/or rectify the condition. In some cases, insurance workflow process may include offering the insured additional coverage or charging additional and/or increased premiums to rectify the exception condition.

In embodiments, a business having automobile coverage may have been underwritten based on the business having a certain number of vehicles. One or more UAV's may be dispatched to the business's facilities, either in response to an exception condition, or as part of a verification process, such as at renewal, to obtain images of parking areas around the facilities. The images may be processed to attempt to identify vehicles owned by the business, such as by distinctive make and model, color, images and lettering appearing on the vehicles, time of day (e.g., counting vehicles around the business facility outside a time window before and/or after operating hours of the business) and the number of vehicles identified counted, and then compared to the number of vehicles identified in the policy. It will be appreciated that these processing steps reduce the risk of incorrectly counting personal vehicles of employees and visitors as vehicles of the business. Data from multiple images, such as from multiple angles, may be correlated for greater accuracy of identification. Processing results indicating a deviation from the insured number of vehicles may result in processing of a policy action.

Similarly, a commercial vehicle insurance policy may be issued to a business and cover only certain categories of vehicles, such as only vehicles below a certain gross vehicle weight, or only certain numbers of vehicles within or above certain ranges or thresholds of vehicle weight. Images obtained from UAV's of parking and loading areas around a business facility may be processed to identify vehicles, such as trucks, that are likely above a certain weight; such vehicles may be counted and compared to policy conditions, and a policy action initiated in the event of a deviation, such as an excessive number of vehicles above a given weight.

Similarly, a commercial vehicle insurance policy may be issued to a business owning one or more vehicles, such as trucks above certain weight limits, requiring a commercial driver's license. The policy may require that only certain named individuals, who have been verified as having a valid and current commercial driver's license, may drive the one or more vehicles. UAV's may obtain images of individuals entering or exiting a driver's side door of, and/or operating, such a vehicle, compare the images, using facial recognition technology, by way of example, to images of approved drivers from driver's licenses or other sources. In the event that the image processing does not indicate a match between the approved driver or drivers and the drivers shown in images obtained by the UAVs, in embodiments if above a threshold level of confidence of a failure to match, a policy action may be initiated.

In embodiments, UAV image data may include infrared sensor data, received from one or more UAVs having one or more infrared-sensitive detectors. Infrared sensor data generally indicates a presence of heat sources. For example, relatively intense infrared images on a portion of a roof of a business may be indicative of cooking equipment in use, and may indicate a usage outside of policy parameters, and result in a policy condition.

In embodiments, UAV image data may be employed for loss control related data processing, such as to identify a potential risk of loss and mitigate possible damage. For example, UAV image data indicating infrared hot spots or other intense infrared images may indicate a fire, such as a slow fire in an inaccessible portion of a home or commercial building, or in a home or commercial building that is not currently occupied. Identification of such a hot spot or other potential risk of loss, such as images indicating damage to doors or windows in an unoccupied building, may result in one or more loss control communications, such as notifications to policy holders, other individuals associated in an insurance database with a policy or a property, such as managers or other employees, and notifications to fire departments or other emergency service providers, and to providers of remediation services, such as contractors having abilities to repair or seal damaged doors and windows.

In embodiments, UAV image data may be employed for loss control data processing to identify potentially hazardous conditions, such as brush or growth near a building in an area with a high risk of fire danger, drained swimming pools without covers, and other issues, which may result in one or more loss control communications to policy holders, other individuals associated in an insurance database with a policy or a property, such as managers or other employees, and notifications to providers of remediation services geared to the particular potentially hazardous condition, such as providers of pool maintenance services and provides of grounds maintenance services.

FIG. 6 shows an exemplary database structure 600 that may be implemented as a database as described herein. Database structure 600 may be implemented as an analytic, management, operational, flat-file, rational, or hierarchical database in a standalone, network, or distributed configuration or as part of a database management system (DBMS) that interact with the user, other applications, and the database itself to capture and analyze data for use in loss control and preemptive claim management such as MySQL, MariaDB, PostgreSQL, SQLite, Microsoft SQL Server, Oracle, SAP, dBASE, FoxPro, IBM DB2, LibreOffice Base and FileMaker Pro. Database 600 includes a number of database column fields 610, 620, 630, 640 and 650 and a number of database rows 660, 662, 664 and 666. Column fields 610, 620, 630, 640 and 650 may correspond to one or more fields such as Insurance Identifier 610, Deviation Source and Type 620, Location 630, UAV Identifier 640 and Data Type 650. Generally, database structure 600 would tabulate the various in force policies that have been flagged with certain activities or issues from the UAV data that has been accessed and analyzed. A certain insurance identifier entry 670 such as an alpha numeric string corresponding to a certain claim number or in force policy may be associated with a certain deviation source and type entry 672, at a certain location entry 674, a UAV identifier 676 that corresponds to a certain data type 678.

Figure 7:
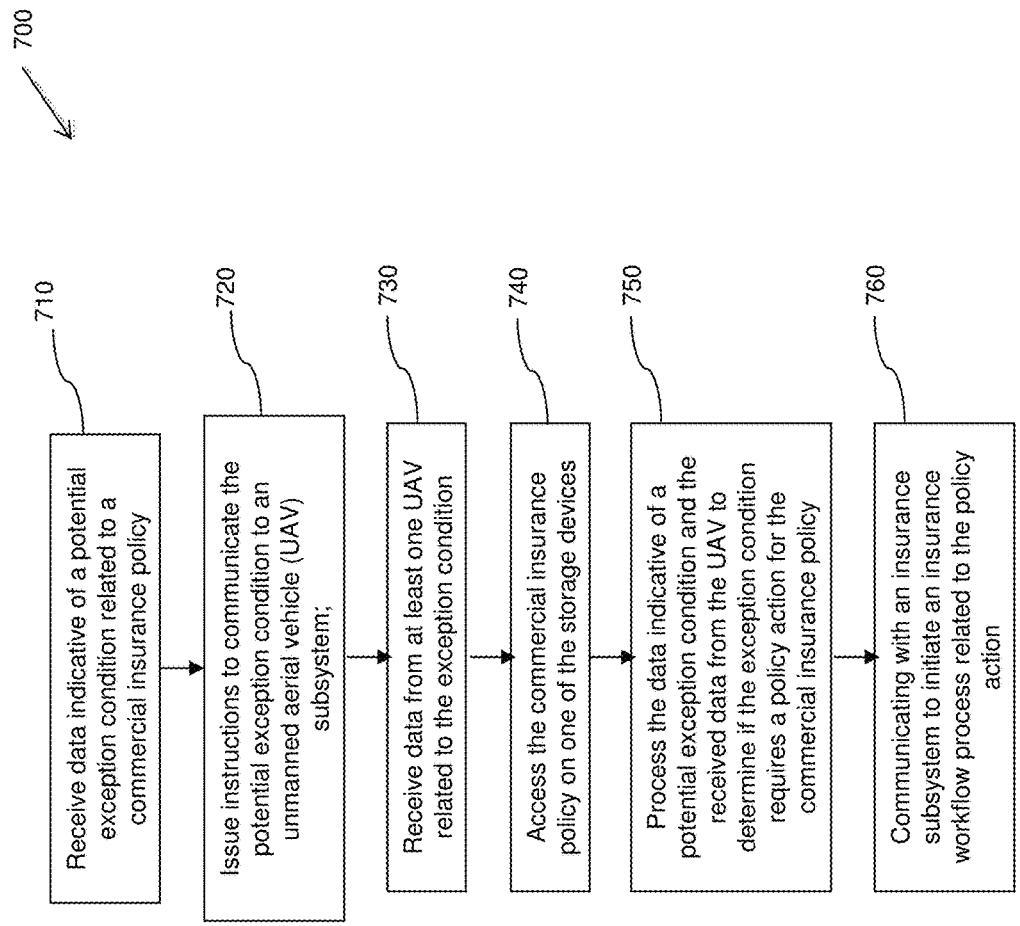
FIG. 7 shows a process flow diagram of an exemplary computer implemented method of the present invention

FIG. 7 illustrates another exemplary computer implemented process of the present invention. This process includes receiving data indicative of a potential exception condition related to a commercial insurance policy, step 710. The process continues with issuing instructions to communicate the potential exception condition to a UAV subsystem, step 720. The process further continues with receiving data from at least one UAV related to the exception condition, step 730. The process continues with accessing the commercial insurance policy on one of the storage devices, step 740. The process continues further with processing the data indicative of a potential exception condition and the received data from the UAV to determine if the exception condition requires a policy action for the commercial insurance policy, and to determine the policy action, step 750. The process continues with communicating with an insurance subsystem to initiate an insurance workflow process related to the policy action, wherein the policy action relates to one of a workers compensation claim decision, disability claim decision, or a commercial insurance underwriting decision, step 760. Such a policy action may include, denying a claim, cancelling a policy, re-underwriting or re-rating a policy, generating an offer for additional or extended insurance coverage, instituting a stop payment via an electronic payment system such as a workers compensation payment or other claim payment, etc.

Figure 8:
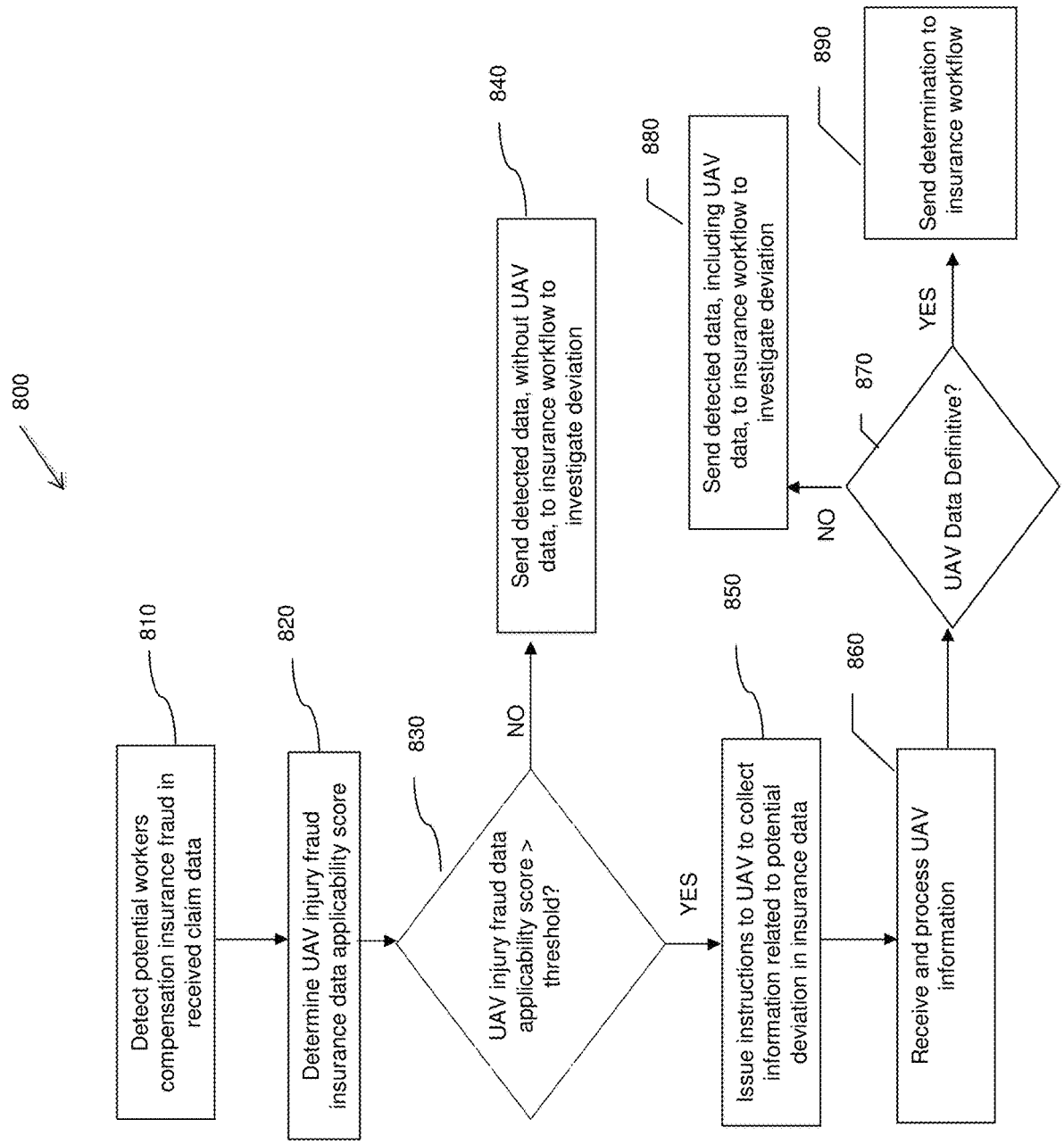
FIG. 8 shows a process flow diagram of an exemplary computer implemented method of the present invention relating to UAV data associated with workers compensation fraud detection.

FIG. 8 is a process flow diagram of an embodiment of the invention associated with a computer-implemented method 800 of workers compensation insurance fraud, or short term or long term disability fraud, detection. In embodiments, workers compensation claim data processing may include processing data using one or more comparisons of received workers compensation claim related data against one or more baseline parameters, filters, or thresholds to identify potential workers compensation insurance fraud associated with a claim, step 810. By way of example, a workers compensation claim involving a diagnosis of a sprained ankle may be associated with a baseline parameter of recovery within a period varying from four to eight weeks dependent on age of the claimant and severity of the injury. The received data may indicate that the claimant is still reporting symptoms preventing walking without pain or support ten weeks after the injury, which may be identified by a system of the invention as an indicator of potential insurance fraud.

In response to the identification of potential insurance fraud, the system may determine, step 820, an UAV insurance injury data applicability score for the potential insurance fraud. The UAV insurance injury data applicability score may be based on accessing values of one or more factors, applying weighting factors to the values, summing the weighted values, and normalizing the resulting sum. Factors applicable to UAV insurance injury data applicability score may include: address type, including apartment address, townhome address, twin address and detached home address. The applicability score is lowest for an apartment address, higher for a townhome address, still higher for a twin address, and highest for a detached home address. The relative scores reflect the relative difficulty of identifying one individual by obtaining image data at the address. Image data of individuals near an apartment building has a low probability of being the workers compensation claimant residing in one of the apartments in the building. Image data of individuals near a detached home has a relatively high probability of being an individual workers compensation claimant residing at the detached home.

The UAV insurance injury data applicability score may also be dependent on tree coverage factor associated with the address. For example, a high tree coverage factor may be associated with a suburban area with many large trees in the Eastern United States. A low tree coverage factor may be associated with an urban address, or with an address in arid areas of the Western United States. A high tree coverage factor would decrease the UAV insurance injury data applicability score, as tree coverage reduces the likelihood of high quality photography showing individuals at an address. A low tree coverage factor increases the UAV insurance injury data applicability score. Tree coverage scores may be associated with addresses based on image analysis of satellite data covering the address, by estimating a percentage of image area not covered by buildings, and then estimating a percentage of the image area not covered by buildings that is covered by trees. Suitable image analysis algorithms may be applied to existing satellite imagery to determine the tree coverage scores.

In embodiments, the tree coverage factor may be date dependent. For example, if the address is in the Northeastern United States, and the tree coverage is primarily deciduous trees, the tree coverage factor may be low from November through April, and high from May through October, by way of example.

In embodiments, the UAV insurance injury data applicability score may be dependent on weather forecast factors. For example, dependent on an urgency associated with the determination, weather forecast data for an upcoming time period may be obtained, such as from one or more weather information websites. Forecast elements that would cause drone flights not to be available or not to provide good image data, such as fog, rain, and wind, may be used in a formula in which those elements reduce the UAV insurance injury data applicability score. Responsive to an urgency value being low, in embodiments, the use of weather data may be omitted.

The UAV insurance injury data applicability score may also be dependent, in embodiments, on injury type. For example, an injury type that indicates that the individual cannot walk, such as a severe knee or ankle injury, or cannot lift heavy objects, such as a back injury, or cannot engage in any strenuous activity, such as a severe cardiac condition, may be associated with a relatively high score. Any photographic evidence of the individual walking, lifting a heavy object, or engaging in strenuous activity, would be probative of fraud. On the other hand, an injury type that interferes with stamina, such as a less severe cardiac condition, or an injury type that interferes with concentration or other ability to perform tasks over a long period, such as certain head injuries, would be associated with a relatively low score.

In an embodiment, the UAV insurance injury data applicability score for workers compensation fraud, short term disability and long term disability fraud, may be determined using the following equation:

$$UAVIIDAS(i) = N \times (w_1 \times AddressType(address_i)) + (w_2 \times InjuryType(i)) + (w_3 \times TreeCoverage(address_i))$$

Where: UAVIIDAS(i) is the normalized UAV insurance injury data applicability score for claim i.

N is a normalization factor.

AddressType is a function that applies a value, indicative of the likelihood of obtaining UAV data relating to an individual resident at an address, to an address, based on assigning an address type, such as apartment, townhouse, twin or detached, to the address.

$address_i$ is an address associated in the insurance database with claim i, and may be a home address of a claimant, for example.

InjuryType is a function that applies a value, indicative of the likely value of UAV data in identifying fraud in a type of injury, to an injury associated with claim i. The value of this function may be determined by a system by use of a look up table that relates injuries to values.

TreeCoverage is a function that applies a value for tree coverage to an address. The value of this function may be determined by a system by use of a look up table that relates addresses to tree coverage values, and/or by accessing satellite or aerial imagery around the address and calculating tree coverage using image analysis. As noted above, the value of this function may be date dependent.

$w_1$, $w_2$, $w_3$ are respective weighting factors.

The determined UAV insurance injury data applicability score may be compared to a threshold value, step 830. Responsive to the UAV insurance injury data applicability score being below the threshold value, the information indicative of potential insurance fraud is forwarded by the insurance data system to an insurance workflow subsystem for investigation, without UAV data, step 840. Responsive to the UAV insurance data applicability score being at least the threshold, the system proceeds to issuing instructions for UAV collection of information. The instructions may include address data and descriptions of data of interest, such as individuals engaged in various activities.

In embodiments, based on data obtained from social media and other sources, additional instructions and address data may be included. For example, an insurance data system may monitor and analyze social media postings of claimants for postings that may be indicative of a discrepancy between reported injuries and physical activities. A posting that indicates that the individual will be at a particular location, such as a park or athletic club, and engaged in physical activity, may be processed, and, based on that posting, the UAV instructions may include addresses of the park or athletic club. By way of example, if a claimant posts to social media a message such as "Going to shoot some hoops," the system may access geographic data near an address of the claimant's home for basketball courts, and provide UAV instructions including addresses of one or more identified basketball courts.

The system then receives and processes UAV data, step 860. In embodiments, the UAV system may be processed via image processing algorithms and rules to determine a definitive result, step 870. By way of example, high quality video showing a claimant for workers compensation or disability benefits, alleged to have a leg injury preventing walking, engaged in running, with facial recognition confirmation of claimant identity, may provide a definitive positive determination of workers compensation or disability fraud. By way of example, high quality video showing a claimant for workers compensation or disability benefits, alleged to have a leg injury preventing walking, in a wheelchair outside the claimant's home, with facial recognition confirmation of claimant identity, may provide a definitive negative determination of workers compensation or disability fraud. In the event of a definitive determination, data indicative of the determination and the UAV data, or information permitting access to the UAV data, may be forwarded to an insurance workflow, step 890, for processing in accordance with confirmed fraudulent benefit workflow procedures. By way of further example, low quality video showing an individual walking near and entering or exiting the claimant's home, with insufficient resolution to confirm identity, may provide a non-definitive determination. In the event of a non-definitive determination, the system may forward information regarding the claim, including the UAV data and/or access information for the UAV data, to an insurance subsystem for an insurance workflow for investigation of benefits fraud or other deviation investigation, step 880.

Figure 9:
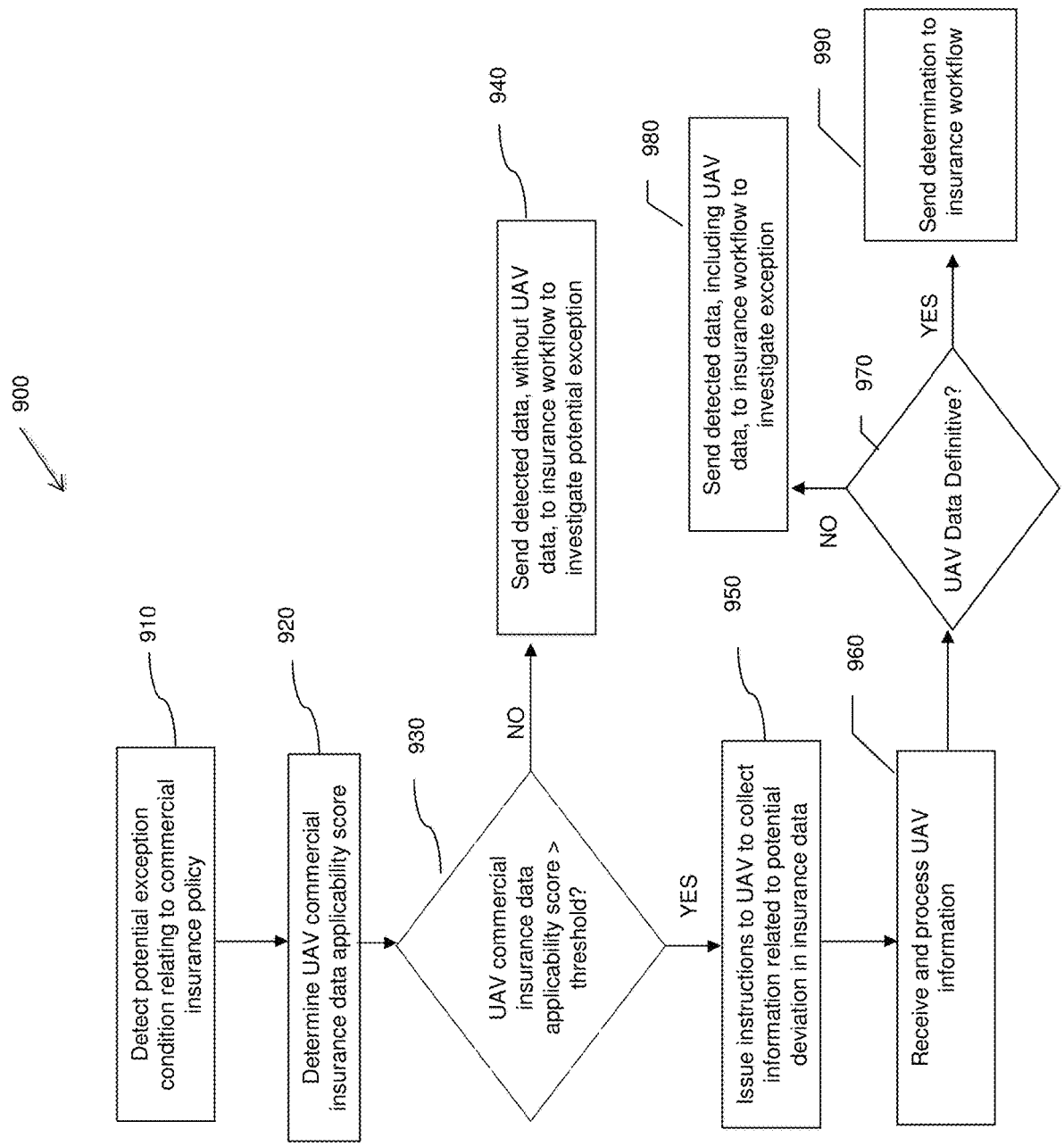
FIG. 9 shows a process flow diagram of an exemplary computer implemented method of the present invention relating to UAV data associated with business insurance exceptions.

FIG. 9 is a process flow diagram of an embodiment of the invention associated with a computer-implemented method 900 of commercial insurance policy exception detection. Exception detection may include identifying uses outside of an issued policy, such as delivery services being performed by a retailer, and inaccurate business classification, such as identification of a business as a florist, when in fact the business is a restaurant/bar. In embodiments, insurance data systems may receive and review data, such as data from publications and social media sources, review sites, and other sources, relating to insured businesses, apply rules to the insured businesses to identify text or image data inconsistent with classifications or scope (e.g., terms describing food items in a social media post about an insured business classified as a hardware store), which provides detection of a potential exception condition relating to a commercial insurance policy, step 910.

In response to the identification of a potential exception condition, the system may determine, step 920, an UAV commercial insurance data applicability score for the potential insurance fraud. The UAV commercial insurance data applicability score may be based on accessing values of one or more factors, applying weighting factors to the values, summing the weighted values, and normalizing the resulting sum. Factors applicable to UAV commercial insurance data applicability score may include: business building type, including multi-business building with no separate street entrance (e.g., office building or enclosed shopping mall); multi-business building with separate street entrances (e.g., strip mall); separate building attached to other buildings, and stand-alone building housing the business. The applicability score is lowest for multi-business building with no separate entrance, higher for a multi-business building with a separate entrance, still higher for attached separate buildings, and highest for a stand-alone building housing the business. The relative scores reflect the relative difficulty of determining whether image data showing activity, such as individuals entering and leaving a building, or vehicles arriving at and leaving from a building or being loaded and unloaded adjacent a building, are associated with a given business in the building.

The UAV commercial insurance data applicability score may also be dependent on tree coverage factor associated with the address. For example, in an older commercial street in a suburb or small town in the Midwest United States or Eastern United States, large street trees may obscure view from an UAV of sidewalks and entrances of buildings, and a building with an address in such a suburb or small town would have a high tree coverage factor. A low tree coverage factor may be associated with large exurban shopping areas, industrial parks, urban addresses, or with an address in arid areas of the Western United States. A high tree coverage factor would decrease the UAV commercial insurance data applicability score, as tree coverage reduces the likelihood of high quality photography showing individuals entering and leaving a business entrance. A low tree coverage factor increases the UAV commercial insurance data applicability score. Tree coverage scores may be associated with addresses, and may have date dependency, as described above in connection with FIG. 8.

In embodiments, the UAV commercial insurance data applicability score may be dependent on weather forecast factors, as described above in connection with FIG. 8.

The UAV commercial insurance data applicability score may also be dependent, in embodiments, on exception type. For example, an exception type indicating that a retailer may also have a delivery business may be associated with a relatively high score, as a UAV may be able to collect video and photographic information of trucks bearing the business name being loaded adjacent to the business. Similarly, an exception type that may be shown by distinctions in hours, such as a florist shop as compared to a bar, may be associated with a relatively high score, as a UAV can obtain video evidence of individuals entering and leaving a business after 9:00 PM or another designated typical closing time for a florist or other type of retailer ordinarily not open late in the evening. In contrast, an exception type, such as a restaurant only covered for cold drinks and cold sandwiches, allegedly adding hot coffee and tea, may not provide any change in video or other data collected by a UAV.

In an embodiment, the UAV commercial insurance data applicability score may be determined using the following equation:

$$UAVCIDAS(i) = N \times (w_1 \times BuildingType(address_i)) + (w_2 \times ExceptionType(i)) + (w_3 \times TreeCoverage(address_i))$$

Where: UAVCIDAS(i) is the normalized UAV commercial insurance data applicability score for business insurance policy i.

N is a normalization factor.

Building Type is a function that applies a value, indicative of the likelihood of obtaining UAV data relating to individuals and vehicles identifiably associated with a business in a building, based on assigning an address to a building type, as described above.

$address_i$ is an address associated in the insurance database with business insurance policy i, and may be a place of business of an insured entity, for example.

Exception Type is a function that applies a value, indicative of the likely value of UAV data in identifying the potential exception associated with the business insurance policy i. The value of this function may be determined by a system by use of a look up table that relates potential exceptions to values.

TreeCoverage is a function that applies a value for tree coverage to an address. The value of this function may be determined by a system by use of a look up table that relates addresses to tree coverage values, and/or by accessing satellite or aerial imagery around the address and calculating tree coverage using image analysis. As noted above, the value of this function may be date dependent.

$w_1$, $w_2$, $w_3$ are respective weighting factors.

The determined UAV commercial insurance data applicability score may be compared to a threshold value, step 830. Responsive to the UAV commercial insurance data applicability score being below the threshold value, the information indicative of potential exception is forwarded by the insurance data system to an insurance workflow subsystem for investigation, without UAV data, step 940. Responsive to the UAV insurance data applicability score being at least the threshold, the system proceeds to issuing instructions for UAV collection of information. The instructions may include address data and descriptions of data of interest, such as times of day of interest, loading and unloading of vehicles at a loading area, and other data.

In embodiments, based on data obtained from social media and other sources, additional instructions and address data may be included. For example, an insurance data system may monitor and analyze social media postings relating to businesses for postings that may be indicative of a discrepancy between covered uses and actual uses. A posting that indicates that a business has 40 employees, while the business's workers compensation policy only lists 20, employees, may result in an instruction to monitor an employee entrance of a building.

The system then receives and processes UAV data, step 960. In embodiments, the UAV system may be processed via image processing algorithms and rules to determine a definitive result, step 970. By way of example, video showing many individual entering and leaving a business location on a Friday evening between 10:00 PM and 1:00 AM, may provide a definitive positive determination of that the business is a bar and not a retailer. Video showing individuals leaving a retailer holding bouquets, and no activity after 6:00 PM, may be deemed to definitively confirm that a business is a florist and not a bar, and hence that the potential exception has been determined not to be an actual exception. By way of further example, video showing trucks being loaded at an appliance retailer, with no identifiable markings bearing the name of the business, may provide a non-definitive determination of whether the retailer is also delivering and installing appliances. In the event of a non-definitive determination, the system may forward information regarding the exception, including the UAV data and/or access information for the UAV data, to an insurance subsystem for a policy exception investigation, step 980.

In embodiments, the determined UAV insurance data applicability score, either of injury type, business insurance type, or other type, may be employed in calculations other than or in addition to comparison to a threshold. By way of example, the score may be used, alone or with one or more other factors, to rank potential fraudulent claims and potential exceptions in determining allocation of available UAV resources. In embodiments, the one or more other factors may include a premium differential in the event the exception is confirmed, or an amount of claims paid or claims predicted. In embodiments, a certain number of UAV flights may be available during a certain time period, and only those claims or policies with a highest rank may be associated with UAV instructions.

Although the methods and features described above with reference to FIGS. 1-9 are described above as performed using the example architecture 100 of FIG. 1 and the exemplary system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-9 may be used alone without the other features and elements or in various combinations with or without other features and elements. Sub-elements of the methods and features described above with reference to FIGS. 1-9 may be performed in any arbitrary order (including concurrently), in any combination or sub-combination.

What is claimed is:

1. A computer system comprising:
   one or more data storage devices storing data relating to a plurality of property insurance policies;
   one or more computer processors in communication with the one or more data storage devices;
   a communications interface in communication with the one or more computer processors and the one or more data storage device; and
   a memory, coupled to the one or more computer processors, storing program instructions which, when executed by the one or more computer processors, cause the one or more computer processors to:
   receive via the communications interface data, other than unmanned aerial vehicle ("UAV") data, indicative of condition of a property related to at least one of the plurality of insurance policies;
   determine, based on one or more data items, and without UAV data, whether collection of data relating to the property via an UAV is applicable in relation to the condition of the property;
   responsive to a determination that collection via UAV is not applicable, forward the data indicative of the condition to an insurance workflow subsystem for investigation, without UAV data;
   responsive to a determination that collection of data relating to the condition of the property via UAV is applicable, issue instructions for controlling UAV collection of information, the instructions causing an onboard computer of at least one UAV to control the UAV to autonomously navigate to a location of the property;
   receive data via the communications interface from the UAV;

process the data from the UAV to determine at least one action; and communicate via the communications interface with an insurance subsystem to initiate an insurance workflow process.

2. The computer system of claim 1, wherein the received data indicative of condition of the property related to at least one of the plurality of insurance policies comprises data relating to property damage associated with a claim under the at least one of the plurality of insurance policies.

3. The computer system of claim 1, wherein the received data indicative of the condition of the property related to at least one of the plurality of insurance policies comprises loss control data.

4. The computer system of claim 3, wherein the action comprises issuing a loss control communication.

5. The computer system of claim 1, wherein the instructions cause the UAV to collect images of a roof of a building.

6. The computer system of claim 1, wherein the received data indicative of the condition of the property relates to an exception condition relating to the at least one of the plurality of insurance policies.

7. The computer system of claim 1, wherein the determining the applicability of UAV data comprises determining the applicability based on a plurality of factors including at least a building type factor and a tree coverage factor.

8. A computer-implemented method, comprising:
receiving, by one or more processors of a computer system, via a communications interface of the computer system, data, other than unmanned aerial vehicle ("UAV") data, indicative of a condition of a property related to at least one of the plurality of insurance policies;
determining, by the one or more computers, based on one or more data items, without UAV data, whether collection of data relating to the property via an UAV is applicable in relation to the condition of the property;
responsive to a determination that collection via UAV would not be applicable, forward the data to an insurance workflow subsystem for investigation, without UAV data;
responsive to a determination that collection of data relating to the property via UAV is applicable, issue instructions for controlling UAV collection of information, the instructions causing an onboard computer of at least one UAV to control the UAV to autonomously navigate to a location of the property;
receive data via the communications interface from the UAV;
process the data from the UAV to determine at least one action; and
communicate via the communications interface with an insurance subsystem to initiate an insurance workflow process.

9. The computer-implemented method of claim 8, wherein the received data indicative of condition of the property related to at least one of the plurality of insurance policies comprises data relating to property damage associated with a claim under the at least one of the plurality of insurance policies.

10. The computer-implemented method of claim 8, wherein the received data indicative of condition of the property related to at least one of the plurality of insurance policies comprises loss control data.

11. The computer-implemented method of claim 10, wherein the action comprises issuing a loss control communication.

12. The computer-implemented method of claim 8, wherein the instructions cause the UAV to collect images of a roof of a building.

13. The computer-implemented method of claim 8, wherein the received data indicative of the condition of the property relates to an exception condition relating to a business use of the property not covered under a commercial insurance policy of the at least one of the plurality of insurance policies.

14. The computer-implemented method of claim 8, wherein the determining the applicability of UAV data comprises determining the applicability based on a plurality of factors including at least a building type factor and a tree coverage factor.

15. A non-transitory computer-readable medium, having stored thereon computer-readable instructions, which instructions, when executed by one or more processors, cause the one or more processors to:
receive via a communications interface data, other than unmanned aerial vehicle ("UAV") data, indicative of a condition of a property related to at least one of the plurality of insurance policies;
determine, based on one or more data items, without UAV data, whether collection of data relating to the condition of the property via an UAV is applicable in relation to the condition of the property;
responsive to a determination that collection of data relating to the condition of the property via UAV is not applicable, forward the data relating to the condition of the property to an insurance workflow subsystem for investigation, without UAV data;
responsive to a determination that collection of data relating to the condition of the property via UAV is applicable, issue control instructions for controlling UAV collection of information, the instructions causing an onboard computer of at least one UAV to control the UAV to autonomously navigate to a location of the property;
receive data via the communications interface from the UAV;
process the data from the UAV to determine at least one action; and
communicate via the communications interface with an insurance subsystem to initiate an insurance workflow process.

16. The non-transitory computer-readable medium of claim 15, wherein the received data indicative of condition of the property related to at least one of the plurality of insurance policies comprises data relating to property damage associated with a claim under the at least one of the plurality of insurance policies.

17. The non-transitory computer-readable medium of claim 15, wherein the received data indicative of condition of the property related to at least one of the plurality of insurance policies comprises loss control data.

18. The non-transitory computer-readable medium of claim 17, wherein the action comprises issuing a loss control communication.

19. The non-transitory computer-readable medium of claim 15, wherein the control instructions cause the UAV to collect images of a roof of a building.

20. The non-transitory computer-readable medium of claim 15, wherein the received data indicative of the condition of the property relates to an exception condition relating to the at least one of the plurality of insurance policies.

* * * * *